US012404985B2

(12) United States Patent
Ndiaye et al.

(10) Patent No.: US 12,404,985 B2
(45) Date of Patent: Sep. 2, 2025

(54) COOLING SYSTEM FOR A VEHICLE LIGHTING MODULE

(71) Applicant: VALEO VISION, Bobigny (FR)

(72) Inventors: Ibrahima Ndiaye, Bobigny (FR); Antonio Ruiz-Garrido, Martos (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/718,951

(22) PCT Filed: Dec. 16, 2022

(86) PCT No.: PCT/EP2022/086484
§ 371 (c)(1),
(2) Date: Jun. 12, 2024

(87) PCT Pub. No.: WO2023/111324
PCT Pub. Date: Jun. 22, 2023

(65) Prior Publication Data
US 2025/0067414 A1 Feb. 27, 2025

(30) Foreign Application Priority Data
Dec. 17, 2021 (FR) ...................................... 2113911

(51) Int. Cl.
*F21S 45/42* (2018.01)
*F21S 45/46* (2018.01)
*F21S 45/47* (2018.01)

(52) U.S. Cl.
CPC ............... *F21S 45/47* (2018.01); *F21S 45/46* (2018.01)

(58) Field of Classification Search
CPC ...... F21S 45/47; F21S 41/334; F21S 48/1109; F21S 48/115; F21S 48/1159;
(Continued)

(56) References Cited

U.S. PATENT DOCUMENTS 10,337,690 B2 7/2019 Tessnow et al.
2009/0316425 A1* 12/2009 Inoue .................... F21V 29/763 362/547
2010/0246204 A1* 9/2010 Inaba ...................... F21S 41/19 362/547

FOREIGN PATENT DOCUMENTS

CN 111623308 A 9/2020
EP 3147556 A1 3/2017
(Continued)

OTHER PUBLICATIONS

Search English translation of WO-2019177050-A1 (Year: 2019).*
(Continued)

*Primary Examiner* — Omar Rojas Cadima
(74) *Attorney, Agent, or Firm* — Valeo Vision

(57) ABSTRACT

The present invention relates to a cooling system for a lighting module of a vehicle, the system includes at least one heat sink and at least one member for axially circulating a fluid, the heat sink including a first heat-dissipating surface and a second heat-dissipating surface extending in intersecting planes, the heat sink including at least one thermal dissipation member and at least one wall which, together with the axial circulation member and with the first dissipating surface, at least partially delimit a circulation chamber in which the fluid circulates and which opens, via a fluid outlet, onto the thermal dissipation member.

18 Claims, 4 Drawing Sheets

(58) Field of Classification Search
CPC .... F21S 48/1216; F21S 48/1388; F21S 48/14; F21S 48/232; F21S 48/24; F21S 48/321; F21S 48/325; F21S 48/328; F21S 48/1305; F21S 48/1317; B60Q 3/60; B60Q 3/82; H03K 17/962; F21V 29/004; F21V 29/02
USPC ......... 362/509, 23.03, 23.04, 85, 88, 94, 95, 362/111, 114, 204, 205, 212, 249.05, 362/249.12, 394, 395, 265
See application file for complete search history.

(56) References Cited

FOREIGN PATENT DOCUMENTS

| | | | | |
|---|---|---|---|---|
| WO | WO-2019177050 A1 * | 9/2019 | ............ | F21S 41/147 |
| WO | 2021083221 A1 | 5/2021 | | |

OTHER PUBLICATIONS

European Patent Office, International Search Report (with English translation) and Written Opinion of corresponding International Application No. PCT/EP2022/086484, dated Apr. 11, 2023.

* cited by examiner

COOLING SYSTEM FOR A VEHICLE LIGHTING MODULE

TECHNICAL FIELD

The present invention pertains to the field of lighting modules, such as front headlamps, for vehicles, notably automotive vehicles. It relates more particularly to a cooling system for a vehicle lighting module.

BACKGROUND OF THE INVENTION

In this field, lighting modules able to generate a beam of light of the "low beam", or dipped, type, having a range in the region of 70 meters, and used essentially at night, are known. The configuration of such a beam of light makes it possible not to dazzle the driver of an oncoming or automotive vehicle or of the vehicle in front, by having a cut-off zone notably in the form of a contrast-change curve of which: a first part is situated below the horizon on a first side of the road, from which side an oncoming vehicle is liable to be; a second part is situated above the horizon of a second side of the road, which is the opposite side from the first side about a centerline of said road; there being an oblique intermediate part connecting the first part to the second part of the contrast-change curve in a central region.

Lighting modules able alternately to generate a first beam of light of the aforementioned low beam type and a second beam of light of the high beam type are known. Such lighting modules employ a first luminous source for generating the first beam of light and a second luminous source for generating a complementary beam of light which, in collaboration with the first beam of light, forms the second beam of light.

The luminous intensity needed for these beams of light entails the use of high-powered luminous sources the operating temperatures of which may damage or even destroy them. In order to avoid this peril, the luminous sources are positioned on a finned radiating device surmounted by a fan. Thus, the heat of the luminous source is removed by thermal conduction and forced convection. As a result, the temperature of the luminous sources is constrained to values that are acceptable for correct operation thereof.

However, in a context where there are severe ergonomic and environmental constraints, such an arrangement is difficult to optimize to improve not only the cooling of the luminous sources but also the bulkiness of these lighting modules.

SUMMARY OF THE INVENTION

The object of the present invention is to at least partially resolve the above problems and to also lead to other advantages by proposing a new type of lighting module for vehicles, notably automotive vehicles.

Another object of the invention is to make the manufacture and assembly of vehicle, notably automotive vehicle, lighting modules, easier.

The present invention proposes a cooling system for a vehicle, notably automotive vehicle, lighting module. The cooling system comprises at least one heat sink and at least one axial-circulation member for axially circulating a fluid, the heat sink comprising a first heat-dissipating surface which extends in a first plane of extension and a second heat-dissipating surface which extends in a second plane of extension secant with the first plane of extension, the heat sink comprising at least a thermal-dissipation member projecting from the first dissipating surface and at least one wall which, with the axial-circulation member and with the second dissipating surface, at least partially delimits a fluid-circulation chamber for the fluid, which opens via a fluid outlet onto the thermal-dissipation member.

The cooling system is special notably in that it comprises a fluid circulation chamber that allows a stream of fluid, for example air, generated by the circulation member to be ducted in such a way that the fluid absorbs the heat released by the heat-dissipating surfaces. The wall that partly delimits the chamber prevents the stream of fluid from flowing in undesired directions. As a result, the flow of the stream of air generated by the circulation member is controlled.

The cooling system is all the more effective when it comprises a thermal-dissipation member able to increase the surface area for exchange of heat between the heat sink and the fluid and therefore increase the cooling power of the system.

The plurality of heat-dissipating surfaces means that it is possible to envision effectively and optimally cooling several light sources, each light source being able to have a different function. It is thus possible to have a first zone dedicated to a first function and comprising at least a first light source thermally connected to the first heat-dissipating surface, and a second zone dedicated to a second function and comprising at least one second light source thermally connected to the first heat-dissipating surface. It is thus possible to have, for these two zones, light sources borne by supports extending in secant planes.

Unless indicated otherwise, the invention may also be carried out according to one or more of the following embodiments considered in combination.

According to one embodiment, the heat sink comprises at least one thermal-dissipation element projecting from the second dissipating surface and arranged in the circulation chamber.

According to one embodiment, the heat sink comprises a plurality of thermal-dissipation elements configured so that the fluid moves within the circulation chamber from a center of the circulation chamber toward said wall and from the center toward the outlet.

According to one embodiment, the heat sink comprises a plurality of thermal-dissipation elements formed by pins. Thus, the air can circulate in several directions and spread over the second dissipating surface.

According to one embodiment, said wall projects from the second dissipating surface.

According to one embodiment, the axial-circulation member is arranged on a free end of said wall, the free end being the opposite end from said second dissipating surface.

According to one embodiment, said wall extends continuously from a first edge delimiting the outlet to a second edge delimiting the outlet.

According to one embodiment, said wall and a housing of the axial-circulation member have a substantially identical circumferential shape and are preferably arranged one in the continuation of the other so as to form a partition.

According to one embodiment, said wall and a housing of the axial-circulation member have complementing shapes. In other words, said wall is configured to fit into the housing of the circulation member.

According to one embodiment, the first plane of extension of the first dissipating surface is substantially perpendicular to the second plane of extension of the second dissipating surface. Here, and throughout the following text, the term "substantially" should be understood to mean within manufacturing tolerances, and any assembly tolerances there might be.

According to one embodiment, the heat sink comprises a first wall and a second wall which between them make an angle of between 7° and 110°, the first wall having said first dissipating surface on the outward side of the angle and the second wall having said second dissipating surface on the inward side of the angle.

According to one embodiment, the first dissipating surface and the second dissipating surface are arranged in such a way as to form an L-shape when viewed in projection on a plane perpendicular to the first dissipating surface and perpendicular to the second dissipating surface. In other words, the first dissipating surface extends from an upper edge of the second dissipating surface.

According to one embodiment, the heat sink comprises at least one protrusion from which said thermal-dissipation member(s) projects or project, the protrusion extending in a plane substantially parallel to the second plane of extension of the second dissipating surface. As a preference, the protrusion is in the continuation of the second dissipating surface beyond the second connecting surface.

According to one embodiment, the or at least one of said thermal-dissipation members is a fin which extends in a plane perpendicular to the first plane of extension of the first dissipating surface and perpendicular to the second plane of extension of the second dissipating surface.

According to one embodiment, the heat sink comprises a plurality of thermal-dissipation members which are fins arranged parallel to one another.

According to one embodiment, the heat sink is made from a heat-conducting material.

According to one embodiment, the heat-conducting material is selected from aluminum, an aluminum alloy, copper, a copper alloy, a thermally conducting polymer and at least one mixture thereof.

According to one embodiment, the first dissipating surface, the second dissipating surface, said wall and the thermal-dissipation member or members are formed in the same material. Thus, the first dissipating surface, the second dissipating surface, the thermal-dissipation member or members and said wall form the one same single component and are therefore made from the same material or materials. This component can be obtained for example by molding or by injection molding. This component therefore differs from elements that are joined together by welding or bonding. These integrally-formed elements thus cannot be separated without destroying one and/or the other of these elements. In instances in which the heat sink also comprises the protrusion and/or the thermal-dissipation element, the protrusion and/or the thermal-dissipation element may also be produced in the same material as the first dissipating surface, the second dissipating surface, said wall and the thermal-dissipation member or members.

According to one embodiment, the axial-circulation member is arranged in such a way as to blow a stream of air directly over said second dissipating surface. For example, the air may be blown in a direction that makes an angle smaller than 20° with respect to the normal to said second dissipating surface, preferably in a direction substantially perpendicular to said second dissipating surface.

According to one embodiment, the axial-circulation member is a fan with an axial impeller, also known as an axial flow fan.

The invention proposes a vehicle, notably motor vehicle, lighting module comprising at least one cooling system having at least one of the above features. The lighting module comprises at least a first light source thermally connected to the first dissipating surface and at least a second light source thermally connected to the second dissipating surface.

According to one embodiment, the heat sink comprises a first wall and a second wall which between them make an angle of between 7° and 110°. In that case, in the lighting module:

- the first wall having, on one side, an upper face that forms said first dissipating surface and, on the other side, a lower face, the first light source or sources being borne by the first dissipating surface,
- the second wall having, on one side, a front face and, on the other side, a rear face, the first light source or sources being borne by the front face and the rear face forming said second dissipating surface.

Thus, the first dissipating surface is situated higher up with respect to the second dissipating surface. This is notably advantageous for performing a first lighting function above the first wall and a second lighting function below the first wall and forward of the second wall. Furthermore, said thermal-dissipation member or members is or are arranged above the outlet; air warmed in the circulation chamber thus flows more naturally upward and therefore toward the thermal-dissipation members.

According to one embodiment, the circulation chamber is superposed on a portion of the collecting surface on which the second light source rests when viewed in projection on a plane parallel to the second plane of extension. In other words, the circulation chamber lies behind the second light source in a direction opposite to the direction of propagation of the majority of the rays of light emitted by the second light source. Thus, the cooling of the second light source is more effective.

According to one embodiment, the optical device is configured to collaborate with the first light source in such a way that the lighting module emits a first beam of light, notably a low beam.

According to one embodiment, the lighting module comprises an optical device configured to collaborate with the second light source in such a way that the lighting module emits a second beam of light, notably a beam that at least partially forms a high beam.

According to one embodiment, the second beam of light is a matrix beam.

According to one embodiment, the first beam of light and the second beam of light together form the high beam or an adaptive lighting beam. An adaptive lighting beam makes it possible to shade the beam according to the position of a vehicle in front or an oncoming vehicle, so as not to dazzle the driver thereof.

According to one embodiment, the first light source comprises at least one electroluminescent element.

According to one embodiment, the second light source comprises at least one electroluminescent element.

According to one embodiment, the electroluminescent element is selected from a light-emitting diode (also known as an LED), an organic LED (also known as an OLED), an active matrix OLED (also known as an AMOLED), a laser LED, a flexible OLED (also known as a FOLED) and a matrix of LEDs and at least one combination thereof.

According to one embodiment, the invention proposes a vehicle, notably an automotive vehicle, comprising at least one lighting module having at least one of the above features.

BRIEF DESCRIPTION OF DRAWINGS

Other features and advantages of the invention will also become apparent both from the following description and from several exemplary embodiments given by way of nonlimiting indication with reference to the attached schematic drawings, in which.

DETAILED DESCRIPTION OF THE INVENTION

It should first of all be noted that, although the figures set out the invention in detail for its implementation, they may, of course, be used to better define the invention if necessary. It should also be noted that, in all of the figures, elements that are similar and/or perform the same function are indicated by the same numbering.

In the following description, a longitudinal, vertical and transverse orientation according to the orientation traditionally used in the automobile industry will be adopted in a non-limiting manner. A longitudinal direction L, a transverse direction T, and a vertical direction V are represented by a trihedron (L, V, T) in the figures.

A horizontal plane is defined as being a plane perpendicular to the vertical direction, a longitudinal plane is defined as being a plane perpendicular to the transverse direction, and a transverse plane is defined as being a plane perpendicular to the longitudinal direction.

Furthermore, the terms "lower", "upper", "top", "bottom", "vertical" and "horizontal" should be interpreted when the object is in the normal position of use on the vehicle.

Figure 1:
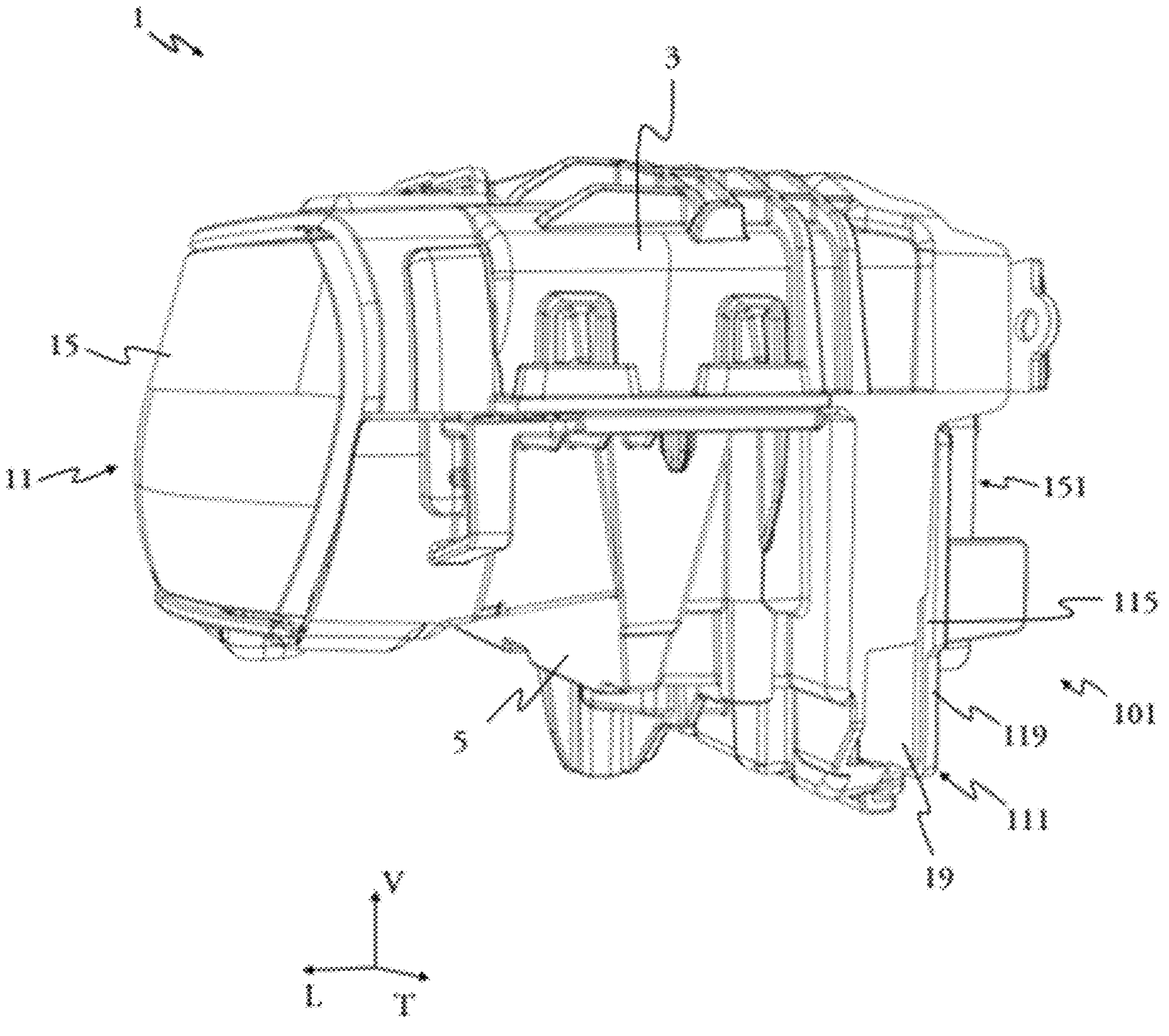
FIG. 1 is a schematic depiction of a lighting module according to the invention for a vehicle.

A lighting module 1 according to the invention, for example intended to be placed in a headlamp arranged at the front of an automotive vehicle, is illustrated in FIG. 1. Advantageously, the vehicle comprises two lighting modules according to the invention which are positioned one on each side of a longitudinal and vertical midplane of the vehicle.

Figure 2:
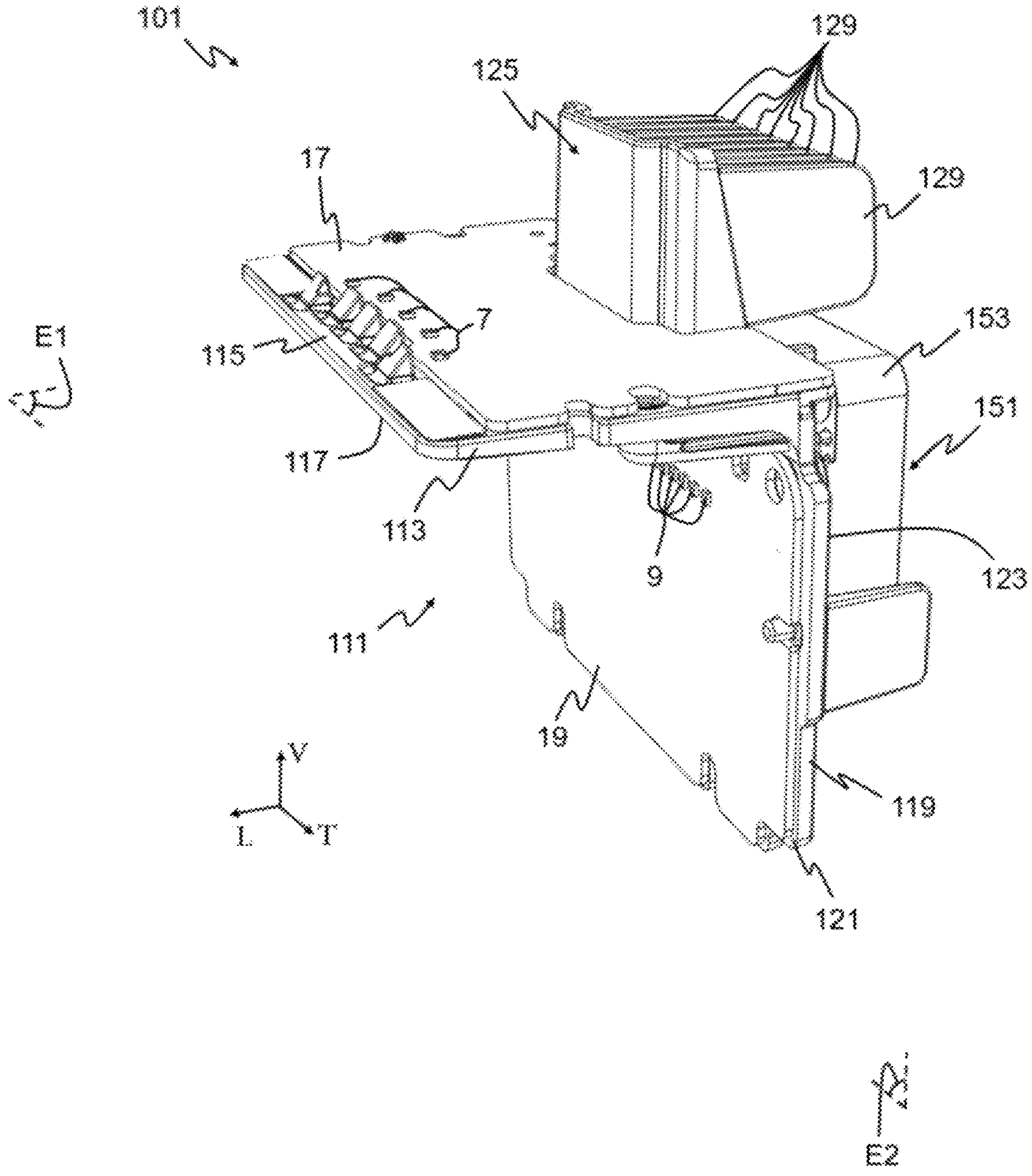
FIG. 2 is a schematic depiction of a cooling system with which the lighting module of FIG. 1 is equipped, from a first viewing angle, the cooling system being equipped with the luminous sources of the lighting module of FIG. 1.

With reference to FIG. 1 and to FIG. 2, the lighting module 1 comprises a first light source 7 and a second light source 9 which are able to emit rays of light, an optical device 11 configured to form and project at least two distinct beams of light from the rays of light emitted by the light sources 7, 9, and a cooling system 101 for cooling the first and second light sources 7, 9.

As the lighting module is illustrated in FIG. 1, the two light sources 7, 9, the optical device 11 and the cooling system 101 are at least partially housed in a cavity formed by the assembly of an upper shell 3 and of a lower shell 5 of the lighting module 1.

The first light source 3 comprises at least one electroluminescent element. In the embodiment depicted in FIG. 2, the electroluminescent element is an LED. As a preference, the first light source 7 comprises a plurality of LEDs. Alternatively, the first luminous source may comprise at least one OLED, at least one AMOLED, at least one laser LED, at least one FOLED, at least one matrix of LEDs or at least one combination thereof.

The second light source 9 comprises at least one electroluminescent element which is an LED as illustrated in FIG. 2. As a preference, the second light source 9 comprises a plurality of LEDs. Alternatively, the second luminous source may comprise at least one OLED, at least one AMOLED, at least one laser LED, at least one FOLED, at least one matrix of LEDs or at least one combination thereof.

The optical device 11 is able to form and project at least a first beam of light and at least a second beam of light, distinct from the first beam of light, from rays of light emitted by the first light source 7 and by the second light source 9. The first beam of light corresponds for example to a beam of the "low beam" type. The combination of the first beam of light with the second beam of light forms, for example, a beam of the "high beam" type, the second beam of light then forming the upper part of the high beam.

The optical device 11 may, as in this example, comprise first and second beam-shaping optics, not visible, configured to deflect the rays of light emitted by the first and second light sources 7, 9 respectively toward the front of the vehicle.

The optical device 11 moreover here comprises projection optics 15 configured to project these deflected rays of light in such a way as to emit the first and second beams of light in front of the vehicle. This then enables the road to be illuminated for the user or users of the vehicle when the environmental conditions require this.

Each of the beam-shaping optics may be positioned in the vicinity of the corresponding light source 7, 9, for example on the same support as that of the light sources 7, 9. Each of the beam-shaping optics may comprise at least a reflector, at least a light guide, at least a lens or at least a combination thereof.

According to the invention, as in this example, the first beam-shaping optics may be a reflector, with one or more reflective cavities which are arranged above the first light source 7. The second beam-shaping optics may comprise a plurality of light guides, the entries of which each face one LED of the second light source 7.

The projection optics 15 may be arranged so that either in combination with the reflector they project an image of the light source, or they project an image of the reflective surface or surfaces of the reflector.

The projection optics 15 may be arranged in such a way as to project an image of the exit of the light guides.

The projection optics 15 are placed in front of the lighting module 1 and are held in position by one end of the upper shell 3 and one end of the lower shell 5.

When the aforementioned beams of light are being generated, the first and second light sources 7, 9 release a great deal of heat which is optimally dissipated by the cooling system 101 of the lighting module 1 according to the invention.

To this end, the cooling system 101 comprises at least one heat sink 111 and at least one axial-circulation member 151 for circulating a fluid, the fluid being air in the embodiment illustrated in all the figures. The heat sink 111 comprises at least a first plate 113, forming a first wall, which extends in a first plane of extension E1, and at least a second plate 119, forming a second wall, which extends in a second plane of extension E2, the first plane of extension E1 being secant with the second plane of extension E2.

Figure 3:
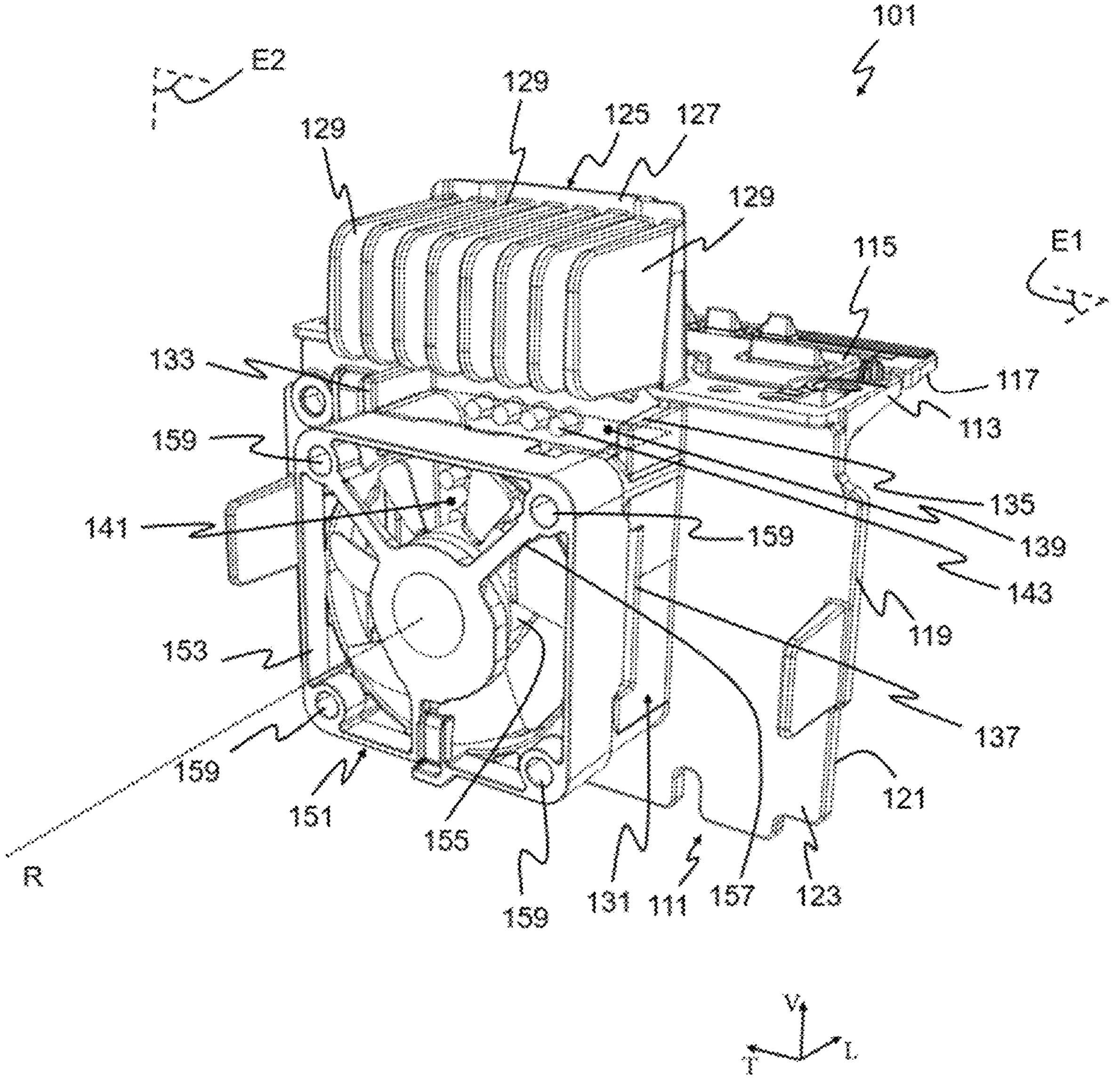
FIG. 3 is a schematic depiction of the cooling system of FIG. 2 from another viewing angle and without the luminous sources of the lighting module.
Figure 4:
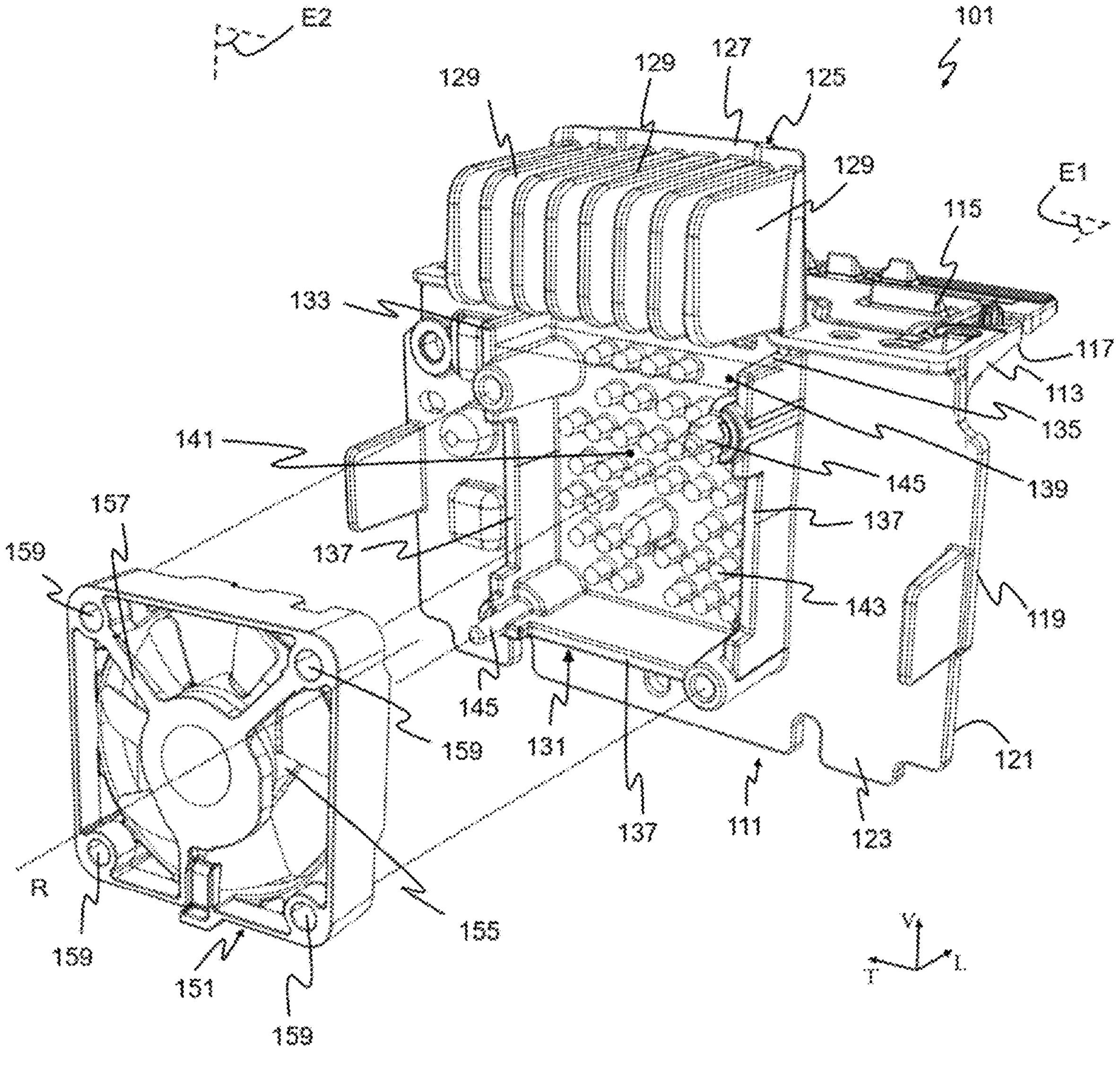
FIG. 4 is an exploded view of the cooling system illustrated in FIG. 3.

In the exemplary embodiment depicted in FIGS. 2 to 4, the first plane of extension E1 is perpendicular to the second plane of extension E2. It will be appreciated, in this context, that the first plane of extension E1 is thus parallel to the horizontal plane as defined hereinabove and the second plane of extension E2 is parallel to the transverse plane defined above.

As is particularly visible in FIG. 2, the first plate 113 comprises, on one side, an upper heat-collecting surface forming a first heat-dissipating surface 115 of the heat sink 111 and on which the first light source 7 is arranged. The first plate 113 comprises, on the other side, a lower surface 117 which is the opposite side to the first dissipating surface 115. As a result, the first dissipating surface 115 and the lower surface 117 extend substantially in the first plane of extension E1.

As a result, the heat released by the first light source 7 in operation is drained, at least partially, by the first dissipating surface 115 and by the first plate 113.

With reference to FIG. 2, the first light source 7 is arranged on a first face of a first electronic board 17 and a second face of the first electronic board 17, opposite to the first face, rests on the first dissipating surface 115. Alternatively, in an example which has not been illustrated, the first light source may be arranged directly on the lower surface, for example so as to collaborate with light guides.

The first electronic board 17 is configured to provide a supply of electrical power to the first light source 7, this power being taken from the electrical power supply, not depicted, of the vehicle. The electronic board 17 may also provide for the transfer of signal and diagnostic data needed by an electronic management system of the vehicle. The first electronic board 17 may comprise a control module for controlling the switching-on of the first light source 7 to generate the first beam of light, for example a low beam.

The second plate 119 comprises a second heat-collecting surface 121 on which the second light source 7 is arranged, as is particularly visible in FIG. 2. The second plate 119 further comprises a second heat-dissipating surface 123 of the heat sink 111, this surface being the opposite surface from the second collecting surface 121. The second collecting surface 121 is a front surface of the second plate 119, and the second dissipating surface 123 is a rear surface of the second plate 119. As a result, the second collecting surface 121 and the second dissipating surface 123 extend substantially in the second plane of extension E2.

The second light source 9 is thus thermally connected to the second collecting surface 121. The heat released by the second light source 9 in operation is drained at least partly by the second collecting surface 121 and by the entirety of the second plate 119 and is dissipated at least in part by the second dissipating surface 123 of the heat sink 111.

With reference to FIG. 2, the second light source 9 is arranged on a first face of a second electronic board 19 and a second face of the second electronic board, opposite to its first face, rests on the second collecting surface 121. Alternatively, the second light source may be arranged directly on the second collecting surface 121.

The second electronic board 19 is configured to provide a supply of electrical power to the second light source 9, this power being taken from the electrical power supply, not depicted, of the vehicle. The second electronic board 19 may also provide for the transfer of signal and diagnostic data needed by an electronic management system of the vehicle. The second electronic board 19 may comprise a control module for controlling the switching-on of the second light source 9 to generate the second beam, for example in matrix form which may comprise strips or squares.

In the exemplary embodiment illustrated in FIGS. 2 to 4, the first plate 113 extends from an upper edge of the second plate 119. As a result, the first plate 113 is in the continuation of the second plate 119, the first collecting surface 115 is in the continuation of the second dissipating surface 123 and the lower surface 117 is in the continuation of the second collecting surface 121. It will therefore be appreciated that the first plate 113 and the second plate 119 together form an "L" when viewed in projection in a plane perpendicular to the first plate 113 and perpendicular to the second plate 119.

The heat sink 111 comprises at least one protrusion 125 which extends from the first dissipating surface 115 in a plane substantially parallel to the second plane of extension E2.

The heat sink 111 moreover comprises at least one thermal-dissipation member 129 projecting from the first dissipating surface 115 and (like here)/or from a rear face 127 of the protrusion 125. Thus, the heat-exchange surface area of the heat sink 111 is increased. The thermal-dissipation member 129 extends, in a direction perpendicular to the second plane of extension E2, from the rear face 127 of the protrusion 125 and rearward, namely in an opposite direction to the second collecting surface 121. As a preference, the heat sink 111 comprises a plurality of thermal-dissipation members 129, as visible in FIGS. 3 and 4.

The thermal-dissipation member 129 have the form of a straight blade extending in a plane perpendicular to the first plane of extension E1 and perpendicular to the second plane of extension E2. In other words, the thermal-dissipation member 129 is a fin. In the embodiment depicted in which there are a plurality of fin-form thermal-dissipation members 129, the thermal-dissipation members 129 are arranged parallel to one another.

The heat sink 111 comprises at least one wall 131 projecting from the second dissipating surface 123. Thus, the heat-exchange surface area of the heat sink 111 is increased. The wall 131 extends, in a direction perpendicular to the second plane of extension E2, from the second dissipating surface 123 in an opposite direction to the second collecting surface 121 in a direction perpendicular to the second plane of extension E2.

Said wall 131, the axial-circulation member 151 and the second dissipating surface 123 are arranged in such a way as to at least partially delimit a fluid-circulation chamber 141 for the fluid, which opens via a fluid outlet 139 onto the fins 129.

The circulation chamber 141 is aligned, along an axis perpendicular to the second plane of extension E2, with a surface delimited by the second light sources 9 on the second collecting surface 121 of the heat sink 111. Thus, the circulation chamber 141 is superposed with the surface delimited by the second light sources 9 when viewed in projection on a plane parallel to the second plane of extension E2. Here, the circulation chamber 141 is therefore to the rear of a portion of the second plate 119 that bears the second light source 9.

The outlet 139, depicted in dotted line in FIG. 3, is defined between a first edge 133 of said wall 131 and a second edge 135 of said wall 131 in the transverse direction T as defined previously, and is defined between a portion of the axial-circulation member 151 and a portion of the second dissipating surface 123 in the longitudinal direction L as defined above. The outlet 139 thus defined therefore here opens upward, and notably as illustrated in FIG. 3, may be contained in a plane that makes an angle, notably of 90°, with the second plane of extension E2 of the second dissipating surface 123.

Generally, according to the invention, and as in this example, said wall 131 surrounds the circulation chamber 141 and, as a preference, is interrupted only to delimit the outlet 139. In other words, in the example as illustrated in FIG. 4, said wall 131 extends continuously from the first edge 133 to the second edge 135.

By way of example, the circulation chamber 141 may, as here, thus have the shape of a square when viewed in projection on the second plane of extension E2.

The heat sink 111 comprises at least one thermal-dissipation element 143 projecting from the second dissipating surface 123 and arranged in the circulation chamber 141. Thus, the heat-exchange surface area of the heat sink 111 is increased. As a preference, as is illustrated in FIGS. 3 and 4, the heat sink 111 comprises a plurality of thermal-dissipation elements 143 configured so that the fluid moves within the circulation chamber 141 from a center of the circulation chamber 141 toward said wall 131 and from the center toward the outlet 139.

The axial-circulation member 151 blows the fluid in a direction of flow that is substantially perpendicular to the second plane of extension E2, namely perpendicular to the second dissipating surface 123.

The thermal-dissipation elements 143 are preferably pins and notably have the shape of a right cylinder. The thermal-dissipation elements 143 may furthermore have substantially the same dimensions, as depicted in FIGS. 3 and 4. In a variant which has not been depicted, at least two thermal-dissipation elements 143 may have different dimensions so as to obtain the desired cooling properties for the cooling system 101.

The heat sink 111 is made of a heat-conducting material. The heat-conducting material is selected from aluminum, an aluminum alloy, copper, a copper alloy, a thermally conducting polymer and at least one mixture thereof.

According to the invention, as here, the first plate 113, the second plate 119, the protrusion 125, the fins 129, the wall 131 and the pins 143 may preferably be formed in the same material. Thus, the first plate 113, the second plate 119, the protrusion 125, the fins 129, the wall 131 and the pins 143 form the one same single component and are therefore made from the same material or materials. This component can be obtained for example by molding or by injection molding. This component therefore differs from elements that are joined together by welding or bonding. These integrally-formed elements thus cannot be separated without destroying one and/or the other of these elements. This simplifies assembly.

The fluid axial-circulation member 151 is arranged on a free end 137 of the wall 131, the free end 137 being the opposite end from the second dissipating surface 123 in a direction perpendicular to the second plane of extension E2 of the plate 119. In other words, said wall 131 forms a curb of which the edge face forms the free end 137. The free end 137 is therefore also to the rear of the second collecting surface 121.

According to the invention, as illustrated in FIG. 3 and in FIG. 4, the axial-circulation member 151 may comprise a housing 153 housing a driveshaft, not visible, and a fan impeller 155 secured to the driveshaft used for rotating the fan impeller about an axis of rotation R which is perpendicular to the second dissipating surface 123.

In particular, the driveshaft is electrically powered by the electric battery. Its supply of electrical power may be placed under the dependency of a temperature sensor so as to regulate the fan speed according to the heat released by the luminous source. The axial-circulation member 151 is, for example, an axial flow fan also known as a fan with an axial impeller.

The housing 153 may take the form of a hollow right cylinder of square cross section. The housing 153 here comprises a plurality of through-holes 159, along the height of the cylinder, the height of the housing being measured from a first base to a second base in a direction perpendicular to the second plane of extension E2.

Some of the through-holes 159 are configured to collaborate with centering pegs 145 projecting from the second dissipating surface 123. Others of the through-holes 159 are configured to allow the passage of screws, not depicted, so as to attach the housing 153 and, therefore, the axial-circulation member 151, to the second dissipating surface 123.

When the axial-circulation member 151 is attached to the heat sink 111, the free end 137 of the wall 131 is in contact with the housing 153 of the axial-circulation member 151. As in the embodiment depicted in FIGS. 3 and 4, the housing 153 may have a circumferential shape substantially identical to the shape of the circulation chamber 141 when viewed in projection on a plane parallel to the second plane of extension E2.

In a variant which has not been depicted, the wall of the heat sink and the housing of the axial-circulation member have complementing shapes. The circulation member may for example be forcibly inserted partially into the volume delimited by the wall.

The fan impeller 155 is in this instance held inside the housing 153 by a blade-like retainer 157. Depending on the direction of rotation of the fan impeller 155, one base may be used for drawing or blowing air into the circulation chamber 141. In this example, the air is blown, which is advantageous with the fins 129 situated plumb with the outlet 139, namely in the air upward direction.

One mode of operation of the lighting module 1 will now be described. When the second light source 9 is switched on in addition to the first light source 7 so that the lighting module 1 emits a beam of light of the "high beam" type, the first and second light sources 7, 9 release heat.

The heat released by the second heat source 9 is removed by the second collecting surface 121 of the heat sink 111 and conveyed to the second dissipating surface 123 of the heat sink 111. In order to achieve effective and optimal dissipation of the heat at the second dissipating surface 123, the axial-circulation member 151 is actuated and thus blows air into the circulation chamber 141, via the rotation of the fan impeller 155 thereof.

The air blown into the circulation chamber 141 passes between the thermal-dissipation elements 143 and picks up the heat released not only by the thermal-dissipation elements 143 but also by the second dissipating surface 123. What is more, the thermal-dissipation elements 143, particularly the pins in this example, allow the blown air to move around within the circulation chamber 141 from the center of the circulation chamber 141 toward the wall 131 and from the center toward the outlet 139.

Said wall 131 also ducts the stream of air toward the outlet 139. The air leaving via the outlet 139 is then forced to pass between the thermal-dissipation members 129, in this instance by being ducted upward between the fins, the air thus picking up the heat released by the thermal-dissipation members 129. As a result, the second light source 9 remains at an acceptable operating temperature while it is in use.

The heat released by the first light source 7 is removed by the first dissipating surface 115 of the heat sink 111 and conveyed to the second dissipating surface 123 of the heat sink 111. The circulation of the air stream in the vicinity of the thermal-dissipation members 129 allows sufficient removal of the heat released by the first light source 7 for these to remain at a suitable operating temperature.

The mode of operation that has just been described is not restricted to the simultaneous operation of the first light source 7 and of the second light source 9. It could for example be implemented when only the first light source 7 is switched on or when only the second light source 9 is switched on.

Of course, the invention is not limited to the examples that have just been described, and numerous modifications may be made to these examples without departing from the scope of the invention.

What is claimed is:

1. A cooling system for a vehicle lighting module with at least two light sources emitting light perpendicular to each other and with one of the light sources emitting light away from the other light source comprising at least one heat sink and at least one axial-circulation member for axially circulating a fluid, the heat sink including a first heat-dissipating surface which extends in a first plane of extension and a second heat-dissipating surface which extends in a second plane of extension secant with the first plane of extension, at least a thermal-dissipation member projecting from the first dissipating surface, at least one wall which, with the axial-circulation member and with the second dissipating surface, at least partially delimits a fluid-circulation chamber for the fluid, which opens via a fluid outlet onto the thermal-dissipation member or members, with the thermal-dissipation member or members extending over and outside of the fluid-circulation chamber towards the at least one axial-circulation member.

2. The cooling system as claimed in claim 1, wherein the heat sink includes at least one thermal-dissipation element projecting from the second dissipating surface and arranged in the circulation chamber.

3. The cooling system as claimed in claim 2, wherein the heat sink includes a plurality of thermal-dissipation elements configured so that the fluid moves within the circulation chamber from a center of the circulation chamber toward the wall and from the center toward the outlet.

4. The cooling system as claimed in claim 1, wherein the wall projects from the second dissipating surface, and the axial-circulation member is arranged on a free end of the wall, the free end being the opposite end from the second dissipating surface.

5. The cooling system as claimed in claim 1, wherein the wall extends continuously from a first edge delimiting the outlet to a second edge delimiting the outlet.

6. The cooling system as claimed in claim 1, wherein the heat sink includes at least one protrusion from which the thermal-dissipation member(s) projects or project, the protrusion extending in a plane substantially parallel to the second plane of extension.

7. The cooling system as claimed in claim 1, wherein the or at least one of the thermal-dissipation members is a fin which extends in a plane perpendicular to the first plane of extension of the first dissipating surface and perpendicular to the second plane of extension of the second dissipating surface.

8. The cooling system as claimed in claim 1, wherein the axial-circulation member is arranged in such a way as to blow a stream of air directly over the second dissipating surface.

9. A vehicle lighting module comprising at least one cooling system including at least one heat sink and at least one axial-circulation member for axially circulating a fluid, the heat sink including a first heat-dissipating surface which extends in a first plane of extension and a second heat-dissipating surface which extends in a second plane of extension secant with the first plane of extension, at least a thermal-dissipation member projecting from the first dissipating surface, at least one wall which, with the axial-circulation member and with the second dissipating surface, at least partially delimits a fluid-circulation chamber for the fluid, which opens via a fluid outlet onto the thermal-dissipation member or members, and at least a first light source thermally connected to the first dissipating surface and at least a second light source thermally connected to the second dissipating surface, with the heatsink including a first wall having an upper face that forms the first dissipating surface and a lower face opposite the upper face, the first light source or sources being borne by the first dissipating surface, a second wall having a front face and a rear face opposite the front face, the second light source or sources being borne by the front face and the rear face forming the second dissipating surface, the lower face adjacent to the front face.

10. The lighting module as claimed in claim 9, wherein the first wall and the second wall meet at an angle of between 7° and 110°.

11. The lighting module as claimed in claim 9, wherein the heat sink includes at least one thermal-dissipation element projecting from the second dissipating surface and arranged in the circulation chamber.

12. The lighting module as claimed in claim 11, wherein the heat sink includes a plurality of thermal-dissipation elements configured so that the fluid moves within the circulation chamber from a center of the circulation chamber toward the wall and from the center toward the outlet.

13. The lighting module as claimed in claim 9, wherein the wall projects from the second dissipating surface, and the axial-circulation member is arranged on a free end of the wall, the free end being the opposite end from the second dissipating surface.

14. The lighting module as claimed in claim 9, wherein the wall extends continuously from a first edge delimiting the outlet to a second edge delimiting the outlet.

15. The lighting module as claimed in claim 9, wherein the heat sink includes at least one protrusion from which the thermal-dissipation member(s) projects or project, the protrusion extending in a plane substantially parallel to the second plane of extension.

16. The lighting module as claimed in claim 9, wherein the or at least one of the thermal-dissipation members is a fin which extends in a plane perpendicular to the first plane of extension of the first dissipating surface and perpendicular to the second plane of extension of the second dissipating surface.

17. The lighting module as claimed in claim 9, wherein the axial-circulation member is arranged in such a way as to blow a stream of air directly over the second dissipating surface.

18. The lighting module as claimed in claim 9, wherein the thermal-dissipation member or members are outside and over the fluid-circulation chamber and extend towards the axial-circulation member.

* * * * *